UNITED STATES PATENT OFFICE.

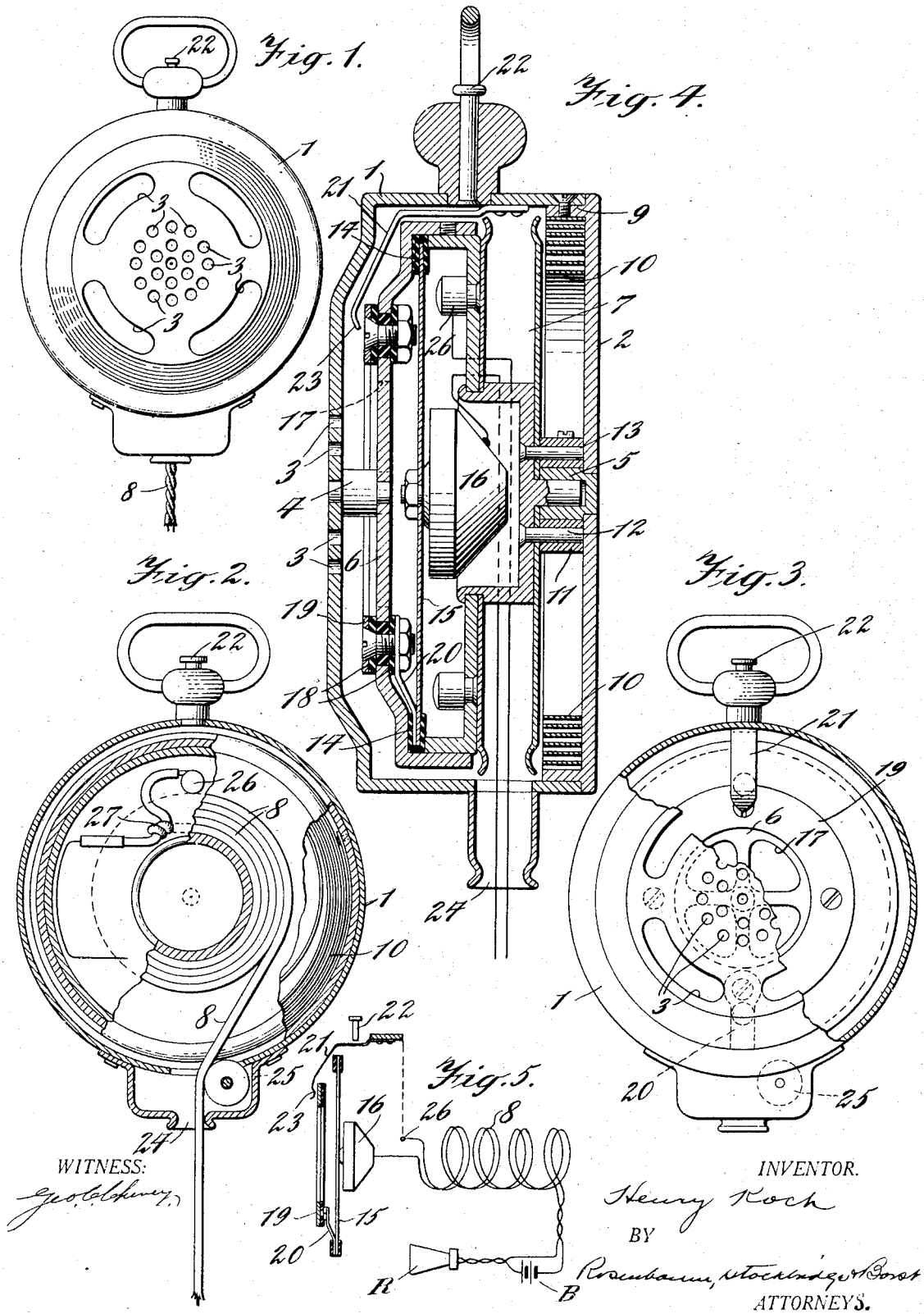
H. KOCH.
TELEPHONE TRANSMITTER.
APPLICATION FILED SEPT. 3, 1919.
1,361,590. Patented Dec. 7, 1920.
WITNESS:
INVENTOR.
Henry Koch
BY
Rosenbaum, Stockbridge & Borst
ATTORNEYS.

HENRY KOCH, OF JAMAICA, NEW YORK, ASSIGNOR TO DICTOGRAPH PRODUCTS CORPORATION, A CORPORATION OF VIRGINIA.

TELEPHONE-TRANSMITTER.

1,361,590.  Specification of Letters Patent.  Patented Dec. 7, 1920.

Application filed September 3, 1919. Serial No. 321,324.

*To all whom it may concern:*

Be it known that I, HENRY KOCH, a citizen of the United States, residing at Jamaica, in the county of Queens and State of New York, have invented certain new and useful Improvements in Telephone-Transmitters, of which the following is a full, clear, and exact description.

This invention relates to telephone transmitters and more particularly to portable transmitters in telephone systems such as are used in automobiles as a means of communication between the passengers and the chauffeur.

In devices of this kind a pocket for the portable transmitter is usually provided on the side of the body adjacent the outlet for the cable connection, and it is customary to provide a cable connection between the transmitter and the fixed contacts on the automobile body sufficiently long to enable the instrument to be used by a passenger on the side of the automobile remote from the pocket. It is desirable however that when the instrument is being used the cable be no longer than is necessary for the convenience of the user, and to effect this automatic reels have heretofore been provided to take up the cable and permit it to pay out as occasion requires. These reels are commonly built into the automobile body, being disposed in a closed recess or compartment provided for them in the side of the body, but that arrangement has proven objectionable in several respects. For instance when there is occasion to repair the reel or its connections, which arises comparatively frequently by reason of the fact that the construction requires a brush or sliding electrical connection between the reel and its support, the entire car must be laid up while the repair is being made. Also the strain on the cable as it is being unwound from the reel is taken by the connections of the cable with the transmitter, and these frequently break loose.

An object of my invention is to provide a reel construction which will obviate these disadvantages. More particularly my object is to provide a construction which has all its operating parts disassociated from the body of the car and which will be simple, compact and durable in construction and neat in appearance.

Another object is to provide a device of this kind in which the current consumption is reduced to a minimum without in any way curtailing the usefulness of the instrument.

Another object is to provide a device of this kind which is easily assembled and taken apart, reliable in operation, and of low cost of production.

Other objects will appear from the accompanying description.

In accordance with my invention I combine the reel and transmitter elements in a unitary structure, the transmitter being mounted to rotate with the reel in the portable casing. A spring motor is contained within the casing and clutched to the reel and transmitter for rotating them to wind the cable on the reel automatically whenever any slack occurs in the cable. The cable can be positively but detachably connected to the support for the instrument.

In order to conserve the current I also coordinate with the rotatable transmitter a suitable circuit closer which in the preferred construction consists of a spring contact member adapted to be manually pressed into engagement with a contact ring carried by the transmitter.

It will be noted that all of the parts liable to derangement are contained within the portable casing which can be easily detached and repaired, leaving the automobile in condition for use in the meantime. Furthermore all brush or sliding contacts are eliminated and the device is less liable to derangement since all the delicate parts are relieved of strain. The device as a whole can be made very neat and compact and can be easily assembled and disassembled, while the cost of production, installation and maintenance is considerably less than in present constructions.

I shall now describe the illustrated embodiment of my invention and shall thereafter point out my invention in claims.

Figure 1 is a front view of my improved device;

Figs. 2 and 3 are similar views, but with portions broken away to better show other parts;

Fig. 4 is an enlarged sectional view with the electrical conductors shown diagrammatically; and Fig. 5 is a diagrammatic view of the electrical circuit.

The portable casing 1 is provided with a removable rear wall 2, and with holes 3 in the front wall for the passage of sound waves. Rotatably mounted in the front and rear walls of the casing by means of pin 4 and boss 5 is a transmitter or diaphragm casing 6, carrying on its rear face a reel 7 for the connecting cable 8. The rear wall 2 has a flange 9 to which the spring 10 is connected at one end. The boss 5 has rotatably mounted thereon the sleeve member 11, to which the other end of the spring 10 is connected. The sleeve member is provided with recesses 12 into which project the pins 13 on the transmitter casing, forming thereby a clutch between the spring and the transmitter casing.

The transmitter casing carries in insulating gaskets 14 a diaphragm 15 of current conducting material, which in turn carries a transmitter button 16, the sound waves passing to the diaphragm through holes 17 in the front of the transmitter casing. Mounted on the front face of the casing 6 by insulation 18 is a circular contact ring 19 concentrically placed with respect to the axis of rotation of the transmitter casing, and this ring is electrically connected to the diaphragm 15 by metal strip 20.

A spring contact 21 is carried by the casing 1 in position to be actuated by the plunger 22, whereby the free end 23 of the contact may be caused to engage and make an electrical contact with the contact ring 19, at any angular position of the rotatable casing 6.

The duplex connecting cable 8 enters the casing through an opening 24 in the bottom thereof, passes over a roller 25, is wound upon the reel 7, passes through one wall of the reel and the transmitter casing, whereupon it is opened, one of the wires being connected to the transmitter button 16 and the other grounded to the casing as by pin 26.

A knot 27 may be placed in the cable where it passes through the side of the reel to take up any pulling strain which may occur as the cable is wound and unwound from the reel.

In Fig. 5 I have shown the circuit diagrammatically. It may include a battery B, a receiver R, and cable 8, one wire of the cable being grounded to the casing through pin 26, and the other wire being connected to the transmitter button. From pin 26, the current will pass through the casing, to the contact spring 21; then to the contact ring 19 whenever plunger 22 is manipulated to move the spring 21 to engage the ring; through strip 20; diaphragm 15; transmitter button 16, back to the other wire of cable 8. It will be observed that current only passes through the circuit when plunger 22 is depressed, so that current is only used when one is speaking or using the instrument.

The instrument is carried in a pocket or suitable place in the automobile, and when one desires to use it, the casing 1 is taken up and carried to a position in which one can conveniently speak into it, the plunger 22 is depressed and the instrument is ready for use. In moving the instrument away from its support, the casing 6 and reel 7 rotate to pay out the cable, during which rotation the spring 10 is tensioned. As soon as any slack in the cable occurs, the spring 10 automatically exerts its force to rotate the reel and casing and rewind the cable. When the instrument is replaced on its support, all the slack will be taken up in this manner.

The plunger 22 is depressed only when one is ready to speak and hence there is no sliding contact between spring 21 and the contact ring 19, yet in any angular position of the transmitter casing and reel, such contact can always be made. I have thus eliminated all sliding contacts, in my device, and enabled it to be detachably but positively connected with the wiring system of the car. In case of trouble in the instrument, the cable 8 can be disconnected from its support and the car used without the instrument while the latter is being repaired.

The removable rear wall 2 and the clutch parts 12 and 13 provide a quick and convenient means for assembling and disassembling the device.

It is obvious that various modifications may be made in the construction of my apparatus, as illustrated in the drawings and above particularly described, within the principle and scope of my invention.

I claim:

1. A telephone transmitter comprising a portable casing, a diaphragm casing rotatively mounted within the portable casing, a diaphragm and current varying means carried within the diaphragm casing, a reel carried by the diaphragm casing and rotative therewith, an electric cable connectible to a relatively fixed support and entering the portable casing and adapted to be wound upon and unwound from the reel and having closed circuit connection through the current varying means, and a spring connected at one end to the portable casing and at its other end to the diaphragm casing and operative to rewind the cable and to keep it taut as the transmitter is moved with respect to the fixed connection.

2. The combination of a portable casing, a transmitter casing having therein a diaphragm and current varying means, said transmitter casing being rotatably mounted within the portable casing, a reel connected for rotation with the transmitter casing, a cable carried by said reel and passing through the portable casing for connection to a relatively fixed support, said cable being connected at its inner end to the opposite sides of the current varying means, and automatic means within the casing for keeping the cable taut as the casing is moved about.

3. The combination of a portable casing, a transmitter casing mounted for rotation within the portable casing and having therein a diaphragm and current varying means, an electric cable positively connected at one end to the current varying means and adapted for positive connection at its other end to a support fixed relatively to the portable casing, a support for the cable carried by the transmitter casing, and a spring motor connected to said cable support and transmitter casing for automatically maintaining the cable taut as the portable casing is moved about.

4. The combination of a portable casing, a transmitter having a diaphragm and mounted for rotation within the portable casing, a reel carried by the transmitter for rotation therewith, a cable connected at one end to the transmitter, wound upon the reel, and adapted to be positively connected at its other end to a relatively fixed support, and automatic means also within the portable casing tending to rotate the reel and transmitter to keep the cable taut as the portable casing is carried about.

5. The combination of a portable casing, bearing members carried by the opposite walls of said casing, a complete transmitter unit supported by said bearing members for rotation within the casing, an electric cable positively connected at one end to the transmitter unit and adapted for connection at its opposite end to a relatively fixed support, and automatic means within the portable casing tending to keep the cable taut as the portable casing is moved about.

6. The combination of a portable casing, an electrical instrument rotatably mounted within said casing, a reel mounted for rotation with said instrument, an electric cable having at one end fixed electrical connections with said instrument wound upon said reel, and adapted to be positively connected at its other end to a relatively fixed support, automatic means for winding the cable upon the reel, and means for controlling the circuit of said instrument and cable comprising complemental parts carried by the instrument and portable casing and operable from the exterior of the portable casing.

7. The combination of a portable casing, an electrical instrument rotatably mounted within said casing, a reel mounted for rotation with said instrument, an electric cable having at one end fixed electrical connections with said instrument, wound upon said reel, and adapted to be positively connected at its other end to a relatively fixed support, automatic means for winding the cable upon the reel, and means for controlling the circuit of said instrument and cable comprising complemental parts carried by the instrument and portable casing and operable in any angular position of the instrument during its rotation within the casing, and also operable from the exterior of the portable casing.

8. The combination of a portable casing, a transmitter casing rotatably mounted within said portable casing, a diaphragm and a transmitter button within said transmitter casing and insulated therefrom, a contact ring mounted upon the exterior of the transmitter casing and insulated therefrom, a member electrically connecting the diaphragm and ring, a reel connected for rotation with the transmitter casing, a cable adapted to be wound upon and unwound from the reel and having its inner end fixedly secured to the reel and electrically connected to the transmitter button and the transmitter casing, and having its outer end passing through the portable casing and adapted to be fixedly and electrically connected to a relatively fixed support, a spring motor within the portable casing for rotating the reel and transmitter casing to wind the cable upon the reel, a contact member carried by and grounded to the portable casing and adapted to be shifted into electrical engagement with the ring in any position of the transmitter casing, and means operable from the exterior of the portable casing for shifting the contact member.

9. The combination of a portable casing, an electrical instrument mounted for rotation within said casing, a reel carried by said instrument for rotation therewith, a spring connected at one end to the casing, a clutch member rotatably mounted in the casing and connected to the other end of the spring, clutch means between the reel and clutch member, and a cable wound on said reel having one end connected to the instrument and the other end adapted for connection to a relatively fixed support, whereby as the casing is moved about the cable will be automatically paid out and retracted.

10. The combination of a portable casing, an electrical instrument therein and mounted for rotation in the front and back walls of the casing, a reel concentric with and connected to rotate with said instrument, a spring concentrically placed with respect to the axis of rotation of the instrument and having one end connected to the casing, connecting means between the other end of the spring and the reel, and a cable wound on said reel, having one end connected to the instrument and the other end adapted to be connected to any relatively fixed support outside of the casing, whereby as the casing is moved about the cable will be automatically paid out and retracted.

11. The combination of a portable casing, an electrical instrument therein and mounted for rotation in the front and back walls of the casing, a reel concentric with and connected to rotate with said instrument, a spring concentrically placed with respect to the axis of rotation of the instrument and having one end connected to the casing, clutch means between the other end of the spring and the reel, and a cable wound on said reel, having one end connected to the instrument and the other end adapted to be connected to any relatively fixed support outside of the casing, whereby as the casing is moved about the cable will be automatically paid out and retracted.

12. The combination of a casing, an electrical instrument, means supporting it for rotation in said casing, a contact ring carried by said instrument, a spring contact carried by the casing and adapted to be moved into contacting engagement with the ring at any point in the rotation of the instrument and ring, means carried by the casing for moving said contact into such engagement with said ring, and an electrical circuit having included therein the said instrument, contact ring, spring contact, and casing.

13. The combination of a portable casing, an electrical instrument mounted for rotation within the casing comprising a diaphragm and a transmitter button, an annular contact member carried by insulation on said instrument, a spring contact grounded to the casing and carried thereby in position to be flexed into contact with the member at any angular position of the instrument and member, means operable from the exterior of the casing for so flexing the spring contact when desired, an electrical connection between said contact member and diaphragm, and between said button and diaphragm, and circuit wires, one of which is connected to the button and the other of which is connected to the casing.

14. The combination of a casing having a front wall and a detachable rear wall, an electrical instrument and reel connected together, means for rotatably supporting the instrument and reel in said front and rear walls, a sleeve member supported for rotation on the rear wall, a spring connected at one end to the rear wall and at the other end to the sleeve member, means for detachably connecting the sleeve member and reel, and a cable wound on said reel and connected at one end to the instrument, the other end leading from the casing for connection to a relatively fixed support.

15. The combination of a casing having a front wall and a detachable rear wall, an electrical instrument and reel connected together, means for rotatably supporting the instrument and reel in said front and rear walls, a sleeve member supported for rotation on the rear wall, a spring connected at one end to the rear wall and at the other end to the sleeve member, clutch means carried by the instrument and reel and detachably engaging with the sleeve member to cause rotation therewith, and a cable connected at one end to the instrument, adapted to be wound around the reel upon the rotation of the same by the spring, and adapted to be connected at its outer end to a relatively fixed support.

16. The combination of a casing having a front wall and a detachable rear wall, an electrical instrument and reel connected together, means for rotatably supporting the instrument and reel between said front and rear walls, a sleeve member supported for rotation on the rear wall, and having a recess therein, a spring connected at one end to the rear wall and at the other end to the sleeve member, a pin carried by the instrument and reel and engaging in the recess of the sleeve member to produce rotation therewith, and a cable connected at one end to the instrument, adapted to be wound around the reel upon the rotation of the same by the spring, and adapted to be connected at its outer end to a relatively fixed support.

In witness whereof I subscribe my signature.

HENRY KOCH.